United States Patent
Jenkins, Jr.

(10) Patent No.: US 10,491,777 B2
(45) Date of Patent: Nov. 26, 2019

(54) PRINTER DEVICE WITH SCANNER IN PAPER PATH

(71) Applicant: Xerox Corporation, Norwalk, CT (US)

(72) Inventor: Jack D. Jenkins, Jr., Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/949,689

(22) Filed: Apr. 10, 2018

(65) Prior Publication Data

US 2019/0312989 A1 Oct. 10, 2019

(51) Int. Cl.
*H04N 1/04* (2006.01)
*H04N 1/12* (2006.01)
*B65H 5/06* (2006.01)
*B65H 5/02* (2006.01)

(52) U.S. Cl.
CPC ........... *H04N 1/0461* (2013.01); *B65H 5/025* (2013.01); *B65H 5/062* (2013.01); *H04N 1/12* (2013.01);*B65H 2801/06* (2013.01); *H04N 2201/0094* (2013.01)

(58) Field of Classification Search
CPC ................ B65H 5/062; B65H 2511/20; B65H 2511/51; B65H 2513/512; B65H 2801/39; B65H 5/26; B65H 7/20; B65H 2220/01; B65H 2220/02; B65H 2220/03; B65H 2220/11; B65H 2301/33312; B65H 2404/6111; B65H 2801/06; B65H 85/00; B65H 15/00; B65H 2301/163; B65H 2301/42212; B65H 2301/5305; B65H 2402/441; B65H 2404/1341; B65H 2404/1421; B65H 2404/144; B65H 2404/174; B65H 2404/632; B65H 2406/30; B65H 2551/27; B65H 2801/27; B65H 29/52; B65H 29/58; B65H 29/60; B65H 33/04; B65H 39/042; B65H 3/0692; B65H 3/46; B65H 5/06; B65H 7/12; H04N 1/52; H04N 1/00045; H04N 1/00408; H04N 1/60; H04N 1/6019; H04N 1/6027; H04N 2201/0094; H04N 1/00034; H04N 1/1215; H04N 1/50; H04N 1/54; H04N 1/6041; H04N 1/6097; H04N 1/00; H04N 1/00005; H04N 1/00015; H04N 1/00023; H04N 1/00031; H04N 1/00037; H04N 1/00039; H04N 1/00082; H04N 1/00087; H04N 1/00092; H04N 1/0032; H04N 1/00575; H04N 1/00602; H04N 1/00612; H04N 1/00636; H04N 1/00708; H04N 1/00827;
(Continued)

(56) References Cited

U.S. PATENT DOCUMENTS 5,229,815 A * 7/1993 Sulenski ............ G03G 15/5012
  399/31
5,710,634 A * 1/1998 Kuriyama .......... H04N 1/00572
  347/3

(Continued)

*Primary Examiner* — Negussie Worku
(74) *Attorney, Agent, or Firm* — Fay Sharpe LLP

(57) ABSTRACT

An imaging device includes a substrate supply, a printing system with at least one marking device adapted to transfer an image to a substrate resulting in a marked substrate, a scanning device and a substrate output. The substrate supply, printing system, scanning device, and substrate output are provided along the same shared substrate path providing an imaging system with reduced complexity.

19 Claims, 3 Drawing Sheets

(58) Field of Classification Search
CPC ........... H04N 1/00917; H04N 1/00925; H04N 1/32203; H04N 1/40068; H04N 1/401; H04N 1/405; H04N 1/4051; H04N 1/4053; H04N 1/46; H04N 1/58; H04N 1/6008; H04N 1/6025; H04N 1/6033; H04N 1/642; H04N 2201/0005; H04N 2201/0082; H04N 2201/04; H04N 2201/3221; G03G 15/104; G03G 15/23; G03G 15/234; G03G 15/36; G03G 15/5062; G03G 15/553; G03G 15/556; G03G 15/602; G03G 15/6529; G03G 15/6585; G03G 21/00; G03G 2215/0658
See application file for complete search history.

(56) References Cited

U.S. PATENT DOCUMENTS

| | | | | |
|---|---|---|---|---|
| 5,754,449 | A * | 5/1998 | Hoshal | G01D 9/005 360/5 |
| 5,835,839 | A * | 11/1998 | Kaneda | B65H 29/242 399/361 |
| 5,884,118 | A * | 3/1999 | Mestha | H04N 1/4078 399/15 |
| 2005/0225623 | A1 * | 10/2005 | Hsieh | H04N 1/0057 347/104 |
| 2010/0110508 | A1 * | 5/2010 | Campbell | H04N 1/00567 358/498 |
| 2010/0268591 | A1 * | 10/2010 | Gnanasambandam | G06F 3/1203 705/14.37 |
| 2014/0201073 | A1 * | 7/2014 | Jenkins, Jr. | G07F 17/26 705/40 |
| 2014/0366396 | A1 * | 12/2014 | Jang | B01F 7/00491 34/381 |
| 2015/0138609 | A1 * | 5/2015 | Golding | H04N 1/00541 358/447 |
| 2015/0371119 | A1 * | 12/2015 | Tosa | G06K 15/1868 358/1.9 |
| 2016/0043978 | A1 * | 2/2016 | Jenkins | H04L 51/16 709/206 |
| 2017/0289387 | A1 * | 10/2017 | Yue | H04N 1/1215 |
| 2018/0039213 | A1 * | 2/2018 | Endoh | G03G 15/556 |

* cited by examiner

PRINTER DEVICE WITH SCANNER IN PAPER PATH

BACKGROUND

The present disclosure and embodiments relate to imaging devices such as printers, including multi-function printers (MFP). More particularly, the disclosure relates to integrating a scanning device into the paper path of a printing device such that the printer/scanner combination utilizes a shared paper path yielding a smaller more reliable device.

A disadvantage of the prior art systems is that they are large and heavy owing some heft to the additional components, e.g. motors, gears, etc. that accompany having multiple paper paths. These additional components increase the complexity of the system. Potentially the system's reliability is reduced by having more components susceptible to failure.

There is thus, a need to provide imaging systems with reduced complexity, size, and weight by providing a single shared paper path utilized by both the printing and scanning operations and to provide systems in which a scanned image can be selectively used to determine nonuniformity problems to obtain color consistency within a page. Further advantages of the present embodiments will become apparent as the following description proceeds, and the features characterizing the embodiments will be pointed out with particularity in the claims annexed to and forming a part of this specification.

INCORPORATION BY REFERENCE

U.S. Pat. No. 5,884,118, the disclosure of which is incorporated herein by reference in its entirety, discloses a printing device having a print output path linked to a scanner input. Here, the printer includes a copy sheet path to automatically convey a copy sheet with a calibration image to a document scanner for scanning the calibration image. While the printer and scanner are linked via the copy sheet path, this linked path is an additional path stemming from the sheet path leading to the output tray.

BRIEF DESCRIPTION

The present embodiments relate to imaging devices for marking images on substrates and having operating components including printing and scanning devices located along a shared substrate path.

According to some aspects of the present disclosure, an imaging device is provided. The imaging device includes a control system including an electronic processor and memory. Also included is a substrate supply, a substrate output and a shared substrate path configured to convey a substrate from the substrate supply to the substrate output. The substrate supply is located at a start of the shared substrate path and the substrate output is located at an end of the shared substrate path. The imaging device also includes a printing system including at least one marking device configured to transfer an image to the substrate traveling along the shared substrate path resulting in a marked substrate. The printing system is positioned between the start of the shared substrate path and end of the shared substrate path. Also included is a scanning device configured to scan at least one side of the substrate traveling along the shared substrate path. The scanning device is positioned along the shared substrate path between the start of the shared substrate path and the end of the shared substrate path.

In accordance with some aspects of the present disclosure, a method for creating a copy of an original image is provided. The method includes inserting an original marked substrate into a shared substrate path of an imaging device, the marked substrate having a top face and a bottom face and wherein the substrate input defines a start of the shared substrate path. Then the method provides advancing the original marked substrate along the shared substrate path to a scanning device positioned along the shared substrate path. Next, the method includes scanning with a scanning device at least one face of the original marked image to generate a scanned image and then advancing the original marked substrate along the shared substrate path to a substrate output of the imaging device. The substrate output defines an end of the shared substrate path. The method further includes advancing a new substrate sheet from the substrate input along the shared substrate path to a marking device also located along the shared substrate path and then marking the scanned image onto the new substrate sheet creating a copy sheet. Lastly, the method includes advancing the copy sheet along the shared substrate path the substrate output of the imaging device.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
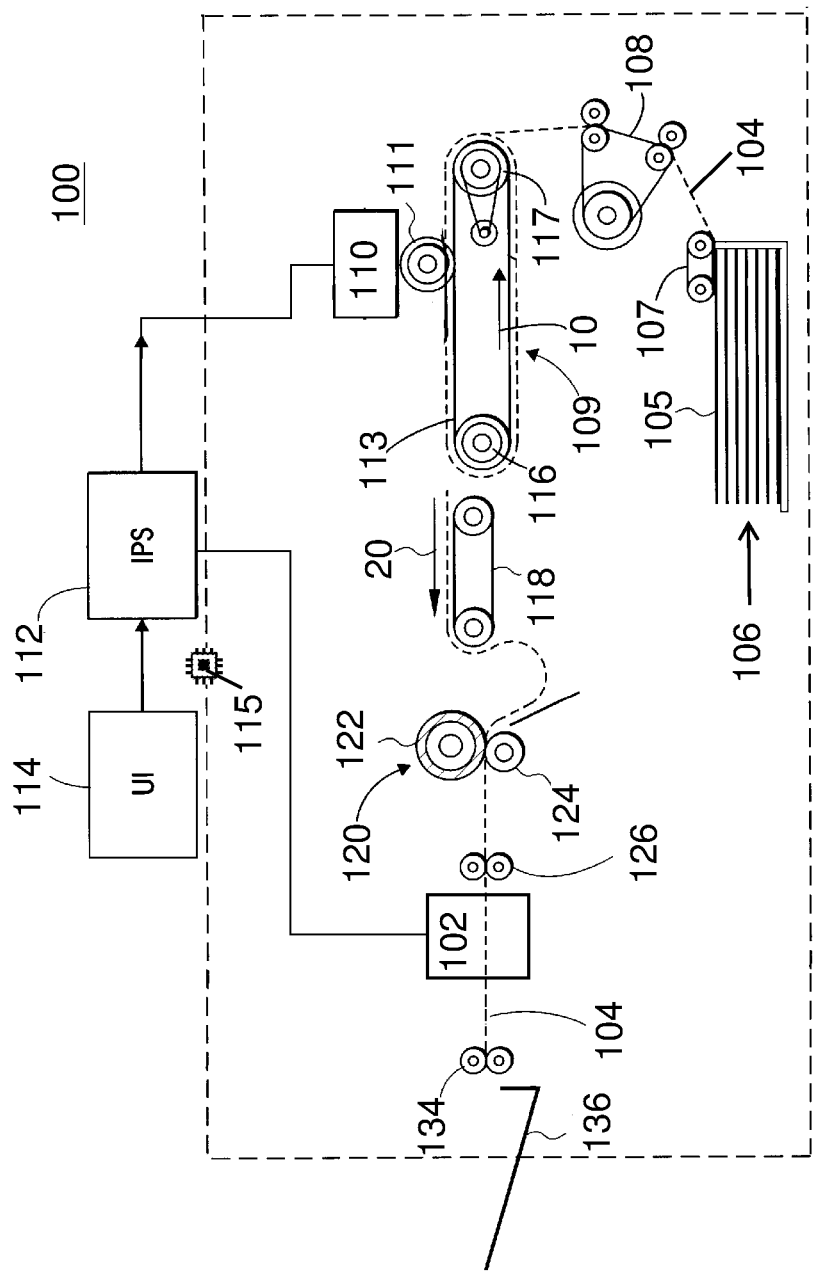
FIG. 1 is a schematic view of an exemplary imaging device including printing and scanning devices positioned along a shared substrate path in accordance with the present embodiments.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiment.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The word "printer" as used herein encompasses any apparatus, such as a digital copier, bookmaking machine, facsimile machine, multi-function machine, etc. which performs a print outputting function for any purpose.

Figure 2:
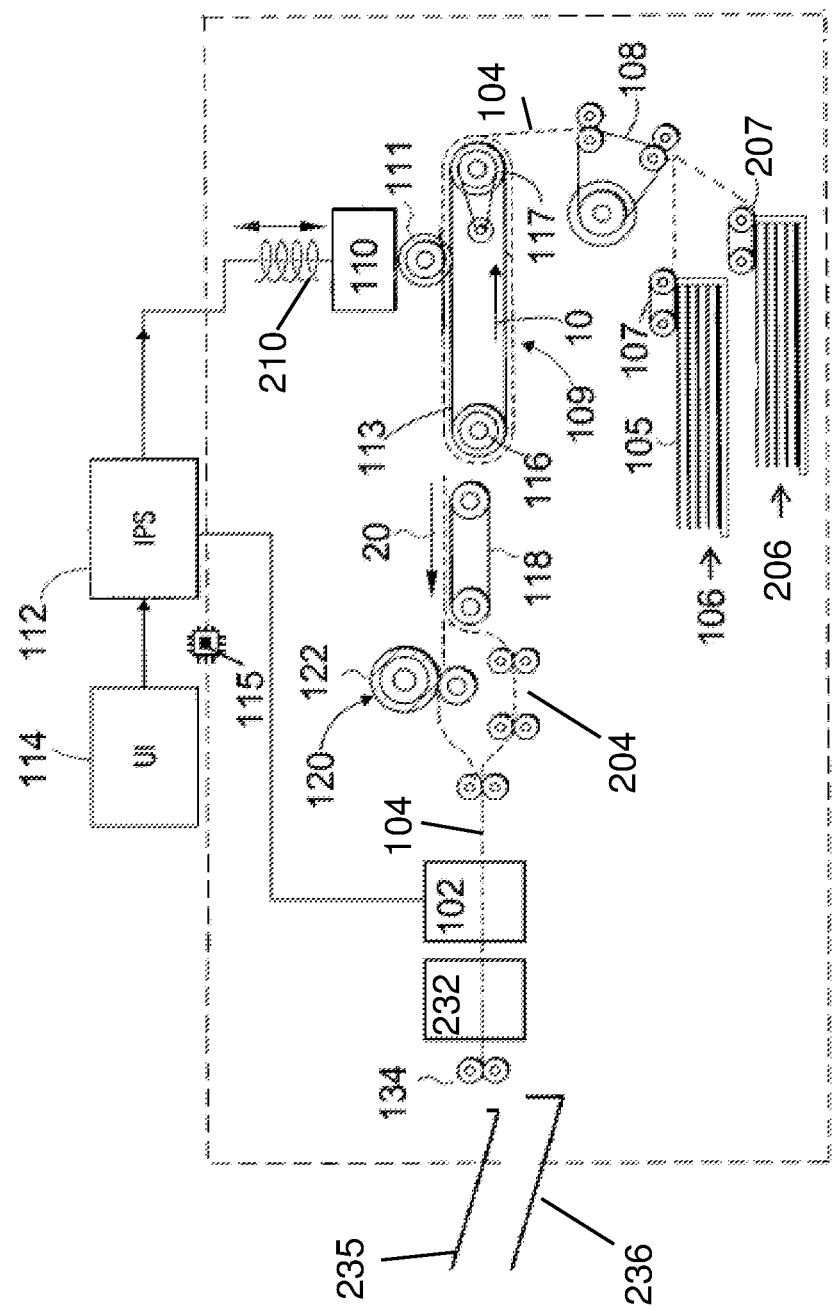
FIG. 2 is a schematic view of another exemplary imaging device including printing and scanning devices positioned along a shared substrate path in accordance with the present embodiments.
Figure 3:
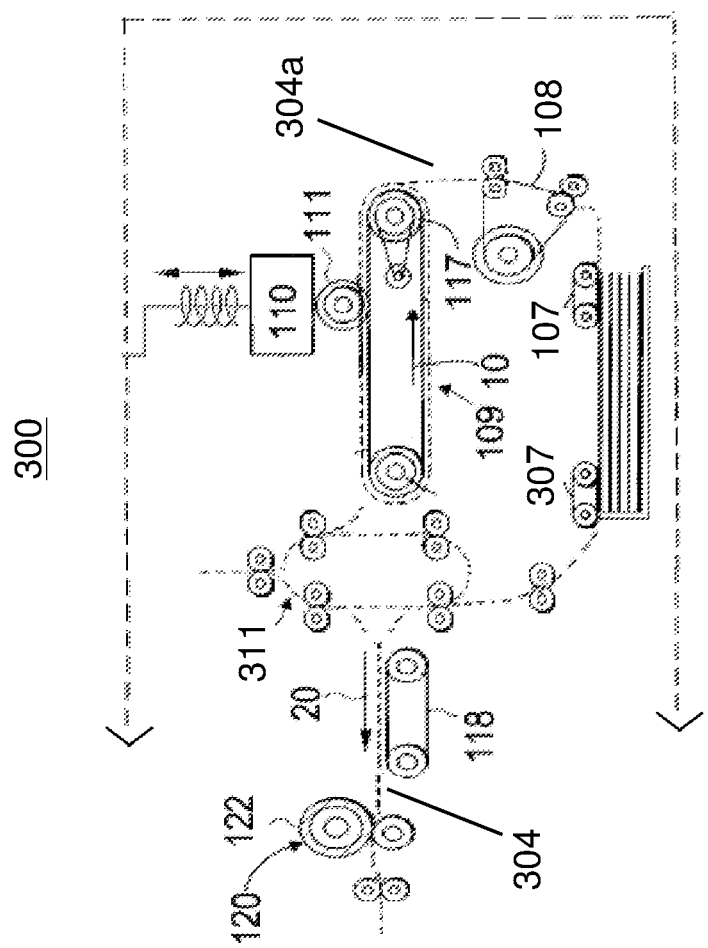
FIG. 3 is a partial schematic elevational view of another exemplary imaging device including printing and scanning devices positioned along a shared substrate path in accordance with the present embodiments.

Schematic elevational views showing an exemplary imaging devices incorporating the features of the embodiments therein is shown in FIGS. 1-3. It will become evident from the following discussion that the embodiments is equally well-suited for use in a wide variety of printing systems including ionographic printing machines, ink jet printers, and discharge area development systems, as well as other more general non-printing systems providing multiple or variable outputs such that the embodiments is not necessarily limited in its application to the particular system shown herein.

With reference to FIG. 1, an imaging device 100 includes a control system including a user interface (UI) 114 for communicating operator commands to a device processor 115. The device processor 115 is configured to control and cause printing and scanning operations of the imaging device 100. The UI 114 enables an operator to control various operator adjustable functions whereby the operator actuates the appropriate input keys of UI 114 to adjust the parameters of the copy. UI 114 may be a touch screen, or any other suitable device for providing an operator interface with the system. In some embodiments, the UI 114 is physically attached to the imaging device 100. In other embodiments, the UI 114 is a remote device in either a wired or wireless connection with the imaging device 100.

In some embodiments, the imaging device 100 includes a memory for storing a set of instructions to operate the various functions included in the imaging device. The memory may also be configured to store a set of density signals or color coordinates associated with a calibration set or associated with a scanned substrate. The memory may also be configured to store files representing a scanned image.

An output signal from UI 114 is transmitted to the Image Processing System (IPS) 112 which then transmits signals corresponding to the desired image to the printing system 110. The IPS 112 is configured to receive a set of density signals from a scanning device 102 and convert the set of received density signals such as red, green and blue density signals to a set of colorimetric coordinates. The IPS 112 contains control electronics for preparing and managing the image data flow to the printing system 110.

The imaging device 100 utilizes a shared substrate path (paper path) 104 from a sheet input 106 to a sheet output 136. The substrate path 104 is a shared path along which all substrate processing components are located. All processes occur along this single line through which the substrate sheet travels including marking and scanning. By compacting all processing activity along a shared path 104, the complexity and number of components needed for multiple paths is significantly reduced.

The printing system 110 of the imaging device 100 includes at least one image marking device 111, operatively connected to the image processing system 112. The shared substrate path 104 is positioned to supply continuous sheets of substrate 105 from a substrate supply tray input 106 to the marking device(s) 111. The supply tray input 106 is located about the start of the shared substrate path 104. In some embodiments, a plurality of transfer rolls (such as rolls 126 and 134 are provided along the substrate path which are configured to advance a substrate 105 in the direction of the arrows 10 and 20.

In some embodiments and positioned about the start of the substrate path 104, a friction retard feeder 107 advances the uppermost sheet from the substrate supply tray 106 onto a pre-transfer transport 108.

In some embodiments and illustrated in FIG. 2, the imaging device 200 includes more than one substrate supply that feeds to the shared substrate path 104. Illustrated here, a substrate may be advanced into the shared substrate path 104 by either supply tray 106 or supply tray 206. Each tray is optionally equipped with a friction retard feeder 107 and 207, respectively. In this way, the imaging device 200 can accommodate and store various kinds of substrates including but not limited to substrates of different size, weight, and color. A substrate supply could also include a manual feed tray positioned to advance at least one substrate that is manually input the manual feed tray by an operator to the shared substrate path 104.

With reference back to FIG. 1, the pre-transfer transport 108 advances the substrate sheet 105 to a sheet transport apparatus 109 in synchronism with the movement thereof so that the leading edge of the substrate sheet arrives at a preselected position, i.e. a loading zone. The sheet is received by the sheet transport 109 for movement therewith in a recirculating path. The substrate sheet transport apparatus 109, has a belt 113 entrained about a pair of substantially cylindrical rollers 116 and 117. As the belt 113 of the transport 109 moves in the direction of arrow 10, the substrate sheet is moved into contact or near contact with the marking device(s) 111 of the printing system 110.

The printing system 110 and one or more marking devices 111 are intended to illustrate any marking device that applies a marking material (toner, inks, etc.) to continuous substrates or sheets of substrates, whether currently known or developed in the future and can include, for example, devices that use a photoreceptor belt or an intermediate transfer belt, or devices that print directly to print media (e.g., inkjet printers, ribbon-based contact printers, etc.).

In some embodiments, the printing system 110 utilizes a photoconductive belt as a marking device 111. Here, a portion of a photoconductive belt passes through a charging station in order to charge the photoconductive belt to a relatively high, substantially uniform voltage potential. The charged photoconductive surface of the belt is rotated to an exposure station, where it receives a modulated light beam corresponding to information derived by scanner. The modulated light beam impinges on the surface of the photoconductive belt, selectively illuminating the charged surface of the photoconductive belt to form an electrostatic latent image thereon. The photoconductive belt may be exposed several times to record multiple latent images representing multiple colors. The belt containing the latent images is advanced to a development station, wherein developer units transfer toner particles to the latent images. The toner image(s) is then transferred to a sheet of media through contact or near contact with the belt marking device.

In some embodiments and with reference to FIG. 2, the printing system 110 may be equipped with an engagement device 210. The engagement device allows the printing system 110 and or marking device 111 to disengage slight so that a substrate, such as an original substrate that does not need marked, passes through the processing area without causing any wear or potential damage to those parts. When marking a substrate is desired, the engagement device 210 may position the marking device 111 such that it is able to mark a substrate passing through. The engagement device 210 may include mechanical springs, solenoids, extending cylinders, or any device and means known in the art to move a part from an engaged position to a disengaged position.

With reference back to FIG. 1, after receiving various markings from the printing system 110 and associated marking devices 111, the sheet transport system 109 directs the substrate sheet along the shared substrate path 104 to a vacuum conveyor, indicated generally by the reference numeral 118. The vacuum conveyor 118 transports the substrate sheet in the direction of arrow 20 for further processing. In some embodiments, the vacuum conveyer 118 transports the sheet to a fusing station, indicated generally by the reference letter 120, where a transferred toner image (if the printer system utilizes toner, such as in printing systems having a photoconductive belt) is permanently fused to the substrate sheet. The fusing station may include a heated fuser roll 122 and a pressure roll 124. The substrate sheet passes through the nip defined by fuser roll 122 and pressure roll 124. The toner image on the substrate sheet contacts fuser roll 122 so as to be affixed to the sheet. Thereafter, the fused sheet is advanced by a pair of rolls 126 for further processing.

In some embodiments and illustrated in FIG. 2, the shared substrate path 104 includes at least one deviation path 204. In this way, a substrate may either be advanced to the fusing station 120 along the shared path 104 or the substrate may avoid and bypass the fusing station 120 by advancement along the deviation path 204. In some cases, a substrate may not need to be advanced through the fusing station 120, as is the case an original document meant for scanning. By deviating the substrate along deviation path 204, the fusing station 120 is subject to less wear or potential damage. While a deviation path 204 is described in relation to bypassing the fusing station 120, it is contemplated that other deviation paths may be included to avoid other stations or processes of the imaging system. By way of non-limiting examples, deviation paths may bypass scanning and marking stations/processes.

A marked original substrate sheet may be advanced to inline scanning device 102 via the shared substrate path 104 to perform a scanning operation of the substrate. Scanning may be accomplished with conventional scanner bar(s) or cameras during any part of the printing process. In some embodiments, the inline scanning device 102 is equipped with scanner bars or cameras such that both sides of a substrate may be scanned. In some embodiments, the shared substrate path 104 may provide multiple passes for a single sheet such that both sides of the sheet may be scanned. The scanning device 102 may also contain document illumination lamps, optics, a mechanical scanning drive, and a charge coupled device (CCD array) for capturing the entire image from original document. In some embodiments, the scanning device contains at least one camera.

In some embodiments, the scanning device 102 is configured to scan a substrate undisturbed as the substrate travels along the shared substrate path 104. In other embodiments, the scanning device 102 may manipulate the movement of the substrate for scanning.

In some embodiments and illustrated in FIG. 1, the scanning device 102 is located after the marking device 111. Here, the scanning device 102 may be used as a sensor input for the marking process. For example, a substrate may be marked by the marking device 111, the scanning device 102 may scan the marked substrate and recognize a missing pixel, light image or other print defect. In some embodiments, the scanning device 102 may be used as a sensor during printing, e.g. to determine substrate position.

In other embodiments, the inline scanning device 102 is configured to receive a calibration image from the printing system 110 and marking device 111. For example, an operator may initiate a calibration procedure on the user interface 114. Upon selection of the calibration procedure, a pre-defined calibration image stored in either the imaging devices' memory or uploaded to the imaging system, is marked on a substrate sheet and immediately scanned by the in-line scanning device 102. The shared substrate path connecting the input tray, printing system, and scanning device thus, provides a calibration system that automatically allows images marked on copy sheets to be scanned without operator intervention. The shared substrate path 104 also enables the imaging device 100 to use a scanned image to determine various device characteristics such as nonuniformity problems to obtain color consistency within a page.

In some embodiments, an operator may initiate the calibration procedure by providing a hard copy of a calibration sheet, such as a pre-marked substrate sheet, to the imaging device's substrate input (supply tray 106). After feeding the test image to the scanning device 102 of the imaging device no other operations are necessary (except putting away the calibration image and the iterated output images). The printed/marked image is automatically passed through the in-line scanning device 102 and the color of the output patches are compared to the original sheet. This process can be iterated until the original and the printed copy are within acceptable limits in color output and consistency.

In some embodiments, the calibration data is stored in the memory of the imaging device 100 and the stored calibration data is compared to the scan data of a marked substrate acquired by the scanning device 102 scanning the marked substrate.

Given that the scanner portion of the printing system is inherently more stable than the printing portion of the system, generally it would not be necessary to use a hard-copy calibrated original. In most cases, an electronic version of the test image would be sufficient to test the calibration of the print engine. This process could be initiated at the request of an operator or simply as a fully automated maintenance operation.

There are a number of other ways that automated calibration could greatly improve the functionality of a printing system. For example the automated process described above could also be useful to keep the output of a specific image stable. By feeding a previously printed image into the scanner, the system could automatically match its current output to its previous output. Thus, irrespective of the optimum calibration, the system could optimize its calibration for the gamut and frequency information in the original image. Another way for the operator to use this system is to calibrate specifically to their own input target. This target might be the color of a corporate logo, a specific facial tone, or any other color that has particular contextual significance for the user.

In some embodiments of an imagining device where the scanning device 102 is located after the marking device 111, an original document to be scanned is first marked by the marking device 111. That is, originals can be marked and scanned in one pass. For example, an original substrate could be "stamped" by the marking device 111, providing a page number, a header, a footer, or any text to the original substrate. The original substrate may be scanned while including the new markings.

In other embodiments, a marking device 111 may be placed after the scanning device 102. That is, originals may be scanned and subsequently marked in one pass. For example, an original substrate may pass through the scanning device 102 such that it is scanned to a repository, such as the memory of the imaging device or an associated computer. As the substrate continues through the shared substrate path 104, a mark is placed on it. One example of such a mark may be an archive locational or a date and time stamp: "Scanned to Archive <location> at <time> on <date>". Of course, the stamp mark may be any text located anywhere on the original document and could be visible or invisible to the naked eye. In some embodiments, the mark may be encrypted, a bar code, or the like. In some embodiments, the scanned input is first processed to determine which archive locations are appropriate prior to printing a mark designating the archive location on the substrate.

In some embodiments where a marking device is placed after a scanning device, the content on an original document or a cover sheet may be used to determine job settings and workflows of the imaging device. For example, a cover sheet may include instructions to be scanned by the scanning device. An associated processor 115 may read and execute the instructions included on the cover sheet. The instructions may modify settings of the device. For example, while an original document may be a color document, a cover sheet accompanying the original document may include instructions to cause the marking device to print copies of the colored original in black in white. Other instructions may include, sorting options, color options, additional markings, duplex options, substrate options, etc.

In some embodiments and with reference to FIG. 2, the imaging device may be equipped with multiple substrate supplies or multiple finishing devices. This allows the imaging device to function as a sorting device. Here, original substrates (or cover sheets) may be scanned, and depending on the content on those substrates, are sorted into different finishers or re-sorted. For example, a stack of one page credit card statements may be located in a first supply tray 106 and a stack different generic promotional offers pre-printed may be located in additional supply trays (for example supply tray 206). The top page of the credit card statement stack is first scanned as page 1, and depending on data read on the top page, the imaging device selects a sheet from another supply tray as a second page. The second page may then be marked according to data read from page 1, such as a customer's name. The multiple pages may be advanced along the shared substrate path 104 to a finisher to be folded for mailing.

In some embodiments, at least one scanning device, such as a camera is mounted to the imaging device 100 to view substrate sheets 105 in the supply tray 106, output tray 136 or anywhere along the shared substrate path 104. In some embodiments, the imaging device is configured for selectively mounting a portable scanning device, such as a camera or smart phone to view a substrate sheet in the supply tray 106, output tray 136 or along the shared substrate path 104. In other embodiments, the imaging device 100 includes an area for placing a substrate sheet to be imaged by a portable scanning device.

After the substrate passes through the scanning device 102, the substrate sheet is advanced along the paper path 104 to a catch tray 136. The catch tray 136 is an output tray of the imaging device 100. That is, the catch tray 136 allows for subsequent removal of the marked substrate sheet by the machine operator from the imaging device 100. The catch tray/substrate output is located at the end of the substrate path 104.

In some embodiments and illustrated in FIG. 2, the imaging device 200 includes at least one finisher 232 provided along the shared substrate path 104 and located before exiting the imaging device via output tray 235 or 236. The at least one finisher 232 provides finishing functions for the imaging device. By way of non-limiting examples, the finisher may collate, staple, punch holes, fold, provide offset modes, or create booklets. In some embodiments, at least one finishing device may be attached to the imaging device and an internal offset finisher may advance a substrate to a desired external finisher.

In some embodiments and illustrated in FIG. 2, the output may include more than one output tray, illustrated as first tray 235 and second tray 236. Here, the scanned original document may be deposited in one tray 235, while copies of the scanned document may be deposited in a second tray 236, or vice versa.

Because the substrate path for a scan process and copy process is shared, the original documents for scanning and the copies of those documents will end up in the same output. In order to minimize any inconvenience regarding sorting and delivering documents, the output may incorporate a solution to separate documents from one another. In some embodiments, the imaging device output is configured with an offset finisher for organizing multiple documents. The offset finisher may set the scanned original into the output tray and then subsequently stack copies of the scanned original into the output tray slightly offset to original. That is, when offsetting the substrate, the offset substrate only partially overlaps the set of documents already placed in the output tray.

In some embodiments and with reference to FIG. 3, the imaging device 300 includes a duplex substrate path 311 along the shared substrate path 304. The duplex substrate path 311 allows for a substrate to be flipped such that both sides of the substrate may be marked by marking device 111. In some embodiments, the imaging device 300 includes a duplex feed friction feed retarder 307 that advances a substrate directly into the duplex substrate path 311. In some embodiments, the shared substrate path section 304a is not needed and all substrates are fed into the shared substrate path 304 through the duplex substrate path 311.

In some embodiments, marks may be printed on one side of a substrate that are used to ensure front to back registration/skew. For example, when side one of a substrate is marked by the marking device 111, near the bottom of side one "invisible" yellow marks may also be printed. When the paper passes through a duplex substrate path 311 and side two is approaching the marking device, a scanner near and prior to the marking device 111 sees the marks on side one and the image processor may correct the image to be marked to account for paper skew so that the images provided on each side of the substrate are aligned.

To initiate a scan or copy process, an operator may initiate a command on the user interface 114. In some embodiments, a multicolor or black and white original document(s) is placed in the supply tray 106 or a manual input tray. The document/substrate is advanced by the friction feed retarder 107 along the substrate path 104. In some embodiments, the original substrate is advanced to the scanning device 102 without the application additional markings by the printing system 110. In other embodiments, the marking device 111 may mark the original document/substrate before it is advanced to the scanning device 102.

The scanning device 102 converts the scanned image to a series of raster scan lines and measures a set of primary color densities, such as red, green and blue densities, at each point of the original document. In scan only processes, the scan information is digitalized and stored. In copy processes, this information is transmitted as an electrical signal to the image processing system (IPS) 112, which converts the set of color density signals to a set of colorimetric coordinates. The IPS 112 contains control electronics for preparing and managing the image data flow to the printer system 110.

A new substrate sheet is fed from the supply tray 106 along the substrate path 104 to the sheet transport 109 where the previously scanned image is transferred to the new sheet as a copy sheet. Both the original document and copy sheet are advanced along the same substrate path 104 to the output/catch tray 136 via a pair of rolls 134.

In some embodiments the copy sheet is scanned (imaged) by the scanning device 102 to verify a quality image. That is, the copy sheet is scanned to ensure that it matches various qualities of the original sheet and that there are little to no defects of the copy image, including but not limited to missing pixels, lightness and misalignments.

In some embodiments, the scanning device 102, marking device 111, and substrate path 104, are all internal components of the imaging device 100. In some embodiments, a scanning device, such as a camera, is mounted on the exterior of the imaging device such that the camera may view and image a substrate located in an input tray or output tray.

Having only one paper path 104 results in lower device cost by reducing the complexity, i.e. the number of parts. Fewer parts also results in better quality and reliability of an imaging device 100, 200 as well as a reduced size.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An imaging device comprising:
    a control system including an electronic processor and memory;
    a substrate supply;
    a substrate output;
    a shared substrate path configured to convey a substrate from substrate supply located at a start of the shared substrate path to the substrate output located at an end of the shared substrate path;
    a printing system comprising at least one marking device configured to transfer an image to the substrate traveling along the shared substrate path resulting in a marked substrate, the printing system positioned between the start of the shared substrate path and end of the shared substrate path; and
    a scanning device configured to scan at least one side of the substrate traveling along the shared substrate path; wherein the scanning device is positioned along the shared substrate path between the start of the shared substrate path and the end of the shared substrate path; and
    wherein the scanning device is configured to receive a pre-defined calibration image stored in the memory for in-line scanning of a marked pre-defined calibration image from the printing system for determining that the marked pre-defined calibration image is within acceptable limits in color output and consistency.

2. The imaging device according to claim 1 further comprising, an image processing system configured to receive a set density signals from the scanning device and convert the set of received density signals to a set of colorimetric coordinates.

3. The imaging device according to claim 1, wherein the scanning device is configured to scan both a top side and a bottom side of a substrate sheet.

4. The imaging device according to claim 3, wherein the scanning device scans the top side and bottom side of the substrate sheet simultaneously.

5. The imaging device according to claim 1, wherein the scanning device is configured to scan the marked substrate.

6. The imaging device according to claim 1, wherein the pre-defined calibration image comprises calibration data for comparison to scan data of a marked substrate acquired by the scanning device scanning the marked substrate.

7. The imaging device according to claim 1, wherein the scanning device comprises at least one camera.

8. The imaging device according to claim 1, further comprising at least one camera mounted to view and image a substrate located in at least one of a substrate input, a substrate output, and along the shared substrate path.

9. The imaging device according to claim 1, wherein the printing system, scanning device and shared substrate path are internal components of the imaging device.

10. The imaging device according to claim 1, wherein a plurality of transfer rolls are provided along the shared substrate path and are configured to advance a substrate along the shared substrate path from the substrate supply to the substrate output.

11. The imaging device according to claim 1, wherein the scanning device is positioned between the printing system and the end of the shared substrate path.

12. The imaging device according to claim 1, wherein the substrate supply is confirmed to accept at least one substrate input into the imaging device for subsequent processing, wherein subsequent processing is one of marking or scanning the at least one substrate.

13. A method for creating a copy of an original image comprising:
    (1) inserting an original marked substrate into a substrate input of an imaging device, the marked substrate having a top face and a bottom face, wherein the substrate input is located at a start of a shared substrate path of the imaging device;
    (2) advancing the original marked substrate along the shared substrate path to a scanning device positioned along the shared substrate path;
    (3) scanning with a scanning device at least one face of the original marked image to generate a scanned image;
    (4) advancing the original marked substrate along the shared substrate path to a substrate output of the imaging device wherein the substrate output is located at an end of the shared substrate path;
    (5) advancing a new substrate sheet from the substrate input along the shared substrate path to a marking device located along the shared substrate path;
    (6) marking the scanned image onto the new substrate sheet creating a copy sheet;
    (7) advancing the copy sheet along the shared substrate path the output of the imaging device; and
    (8) calibrating the scanned image with a pre-defined calibration image stored in a memory for in-line scanning of a marked pre-defined calibration image from the imaging device without operator intervention.

14. The method according to claim 13, wherein the scanning device simultaneously scans the top face and bottom face of the original marked substrate.

15. The method according to claim 13, wherein scanning the original marked substrate comprises generating a set of density signals representing the original image.

16. The method according to claim 15, wherein the method includes sending the set of density signals to an image processing system, the image processing system configured to receive a set of density signals from the scanning device and convert the set of received density signals to a set of colorimetric coordinates.

17. The method according to claim 16, wherein the set of colorimetric coordinates are transmitted to a printing system including at least one marking device.

18. The method according to claim 13, further comprising scanning the copy sheet before advancing the copy sheet to the output of the imaging device.

19. The method according to claim 18, further comprising comparing scanned image of the original marked substrate to the scanned imaged of the copy sheet.

* * * * *